US006724291B1

(12) United States Patent
Byaliy et al.

(10) Patent No.: US 6,724,291 B1
(45) Date of Patent: Apr. 20, 2004

(54) DOOR SENSING FUSE BLOCK WITH SIDE EXTENDING ROTARY DISCONNECT

(75) Inventors: Edward Byaliy, Shorewood, WI (US); John Henry Schmidt, Jr., Waukesha, WI (US); Thomas A Slamka, Waterford, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/377,969

(22) Filed: Feb. 28, 2003

(51) Int. Cl.[7] ........................... H02B 1/18; H01H 71/10

(52) U.S. Cl. ....................... 337/196; 337/212; 337/144; 337/145; 337/168; 337/189; 361/626; 361/642; 361/646

(58) Field of Search ................................ 337/196, 212, 337/142–144, 145, 146, 168, 189; 361/104, 626, 642, 646, 833, 837

(56) References Cited

U.S. PATENT DOCUMENTS 4,233,482 A * 11/1980 DiMarco et al. ............ 200/255
4,724,512 A * 2/1988 Bischof et al. ............. 361/642
5,295,849 A * 3/1994 Jeffcoat et al. ............. 439/266
5,322,982 A * 6/1994 Leger et al. ................ 200/401
5,434,376 A * 7/1995 Hyatt et al. ................. 200/293
5,559,489 A * 9/1996 Weiden ....................... 337/215
5,609,245 A * 3/1997 Cassity et al. .............. 200/283
5,914,460 A * 6/1999 Mowery et al. .............. 174/50
5,986,211 A * 11/1999 Greer et al. .................. 174/61
5,990,439 A * 11/1999 Pever ......................... 218/156
6,031,446 A * 2/2000 Prohaska et al. ........... 337/215

FOREIGN PATENT DOCUMENTS

GB 2367948 A * 4/2002 ............ H01H/3/04

* cited by examiner

*Primary Examiner*—Anatoly Vortman
(74) *Attorney, Agent, or Firm*—Quarles & Brady; Alexander M. Gerasimow

(57) ABSTRACT

A fuse block for cabinet mounting provides a shaft that may exit a side of the cabinet to be received by a handle mounted on that side. A finger attached to the inner cabinet door provides for an interlock by engaging with a bolt communicating with the shaft preventing inadvertent opening of the cabinet when the fuse block is connected to power and/or connecting the fuse block to power when the cabinet door is open.

21 Claims, 5 Drawing Sheets

DOOR SENSING FUSE BLOCK WITH SIDE EXTENDING ROTARY DISCONNECT

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to electrical fuse blocks for mounting in cabinets and having rotary disconnect shafts extending out of the cabinets to a handle, and in particular, to a fuse block in which the handle may be mounted on the side of the cabinet yet which provides an interlock limiting operation of the fuse block when a cabinet door is open.

Fuse blocks, as are well known in the prior art, provide one or more sockets for receiving standard electrical fuses having a fusible link that will melt and separate when excessive current is drawn through the fuse. The fuse block may include terminals for attaching power connections to the fuse block, and thus serves to simplify the wiring of the fuses into series with power carrying conductors.

It is common to mount one or more fuse blocks in a cabinet having a door that may be closed to prevent inadvertent access to exposed conductors inside. The fuse block may incorporate a disconnect allowing disconnection of power from the fuse block. The disconnect may be used when fuses need to be changed or when it is necessary to remove power from the fuse connected circuits and the associated equipment when the equipment is idle or must be worked on.

The disconnect may be operated by a rotary shaft extending forward from the fuse block through the door cabinet to be received by a handle held on the cabinet door. The handle allows power to be disconnected without opening the cabinet door and exposing the internal wiring. The handle may, in addition, have a lockout accepting a padlock and preventing turning of the handle to reconnect power except by the holder of the padlock key. In addition, the handle may be designed to grip the shaft except when the disconnect is in the open circuit position, thus preventing opening of the cabinet door until power is removed from the fuse block. In this way, an interlock is provided to prevent unintended opening of the cabinet when the fuse block is connected.

In an alternative configuration of the fuse block, the shaft may extend out of a side of the cabinet to be received by a handle mounted on the sidewall of the cabinet. In this case, the handle is always connected with the fuse block shaft and thus does not serve as an interlock to hold the door closed when the fuse block is connected to power.

Generally, the fuse blocks will be placed in a wide variety of cabinets of different sizes and in different locations within the cabinets. What is needed is an interlock system for such a fuse block using a side mounted handle that works with a variety of different cabinet sizes and placements.

BRIEF SUMMARY OF THE INVENTION

The present invention provides a door interlock system that works with a fuse block having side mounted handles. A finger is attached to the door to provide an indication that the door is shut and a means for locking the door when the fuse block is powered. The interlock accommodates over travel of the finger thus allowing a single finger or small number of standard fingers to accommodate a variety of different cabinet dimensions and mounting conditions.

Specifically, the present invention provides a disconnect mechanism for a fuse block, where the fuse block receives power connections and has a support face for mounting against the rear panel of a cabinet to hold one or more fuses accessible from a front face of the fuse block opposite the support face. The disconnect mechanism provides a rotary shaft communicating with the fuse block and extending outward along the rear panel when the support face of the fuse block is mounted against the rear panel. An outer end of the rotary shaft is adapted to receive a portion of a door handle mounted on the side of the cabinet so that the rotary shaft can be rotated by the handle to disconnect the fuses from the power connections.

A bolt operator extends radially from the rotary shaft to rotate therewith and provide a stop surface that may be engaged by a bolt, the bolt moving between a lock position and an unlock position. In the lock position, the bolt engages the stop surface preventing free rotation of the rotary shaft to connect the fuses to power. In the unlock position, the bolt is disengaged from the stop surface allowing free rotation of the rotary shaft to connect the fuses to power. A finger mounted on the lid of the cabinet engages the bolt when the lid is closed to move the bolt to the unlocked position.

It is thus one object of the invention to prevent inadvertent connection of the fuse block to power when the cabinet door is open. When the cabinet door is open, the finger on the lid is withdrawn leaving the bolt in the locked position preventing free rotation of the rotary shaft to the “ON” position.

The bolt operator may further provide a bolt-retracting surface engaging the bolt to move the bolt to a door release position. The bolt may engage the finger to prevent opening of the cabinet door when the bolt is not in the door release position. The bolt-retracting surface may engage the bolt only when the rotary shaft is positioned to disconnect the fuses from the power connections.

Thus, it is another object of the invention to prevent opening of the door inadvertently when power is connected to the fuse block.

The finger may include a cam surface moving the bolt to the unlocked position when the door is fully closed.

Thus it is another object of the invention to allow for free reconnection of the fuse block when the door is closed.

The bolt may be a lever centrally mounted on an axle extending parallel to the rotary shaft. The lever may pivot about the axis of the axle to move between the locked and unlocked positions.

Thus it is another object of the invention to provide a simple mechanism to produce the interlock of the present invention.

The axle may be sized to extend through a sidewall of the cabinet when the support face of the fuse block is mounted in the cabinet.

Thus it is another object of the invention to allow overriding of the door-locking interlock in the event that it is necessary to have access to the cabinet while the power is on. It is an additional object of the invention to provide for this ability to defeat the locking of the door from a position near the handle that is accessible to the user. The end of the axle may extend outside of the cabinet and there, shrouded by a tube, may have a screw head to allow actuation of the bolt with a standard screwdriver fitting within the shrouded tube.

Thus it is another object of the invention to prevent inadvertent defeating of the door lock.

The lever may include a spring rotationally biasing the lever toward engagement with the bolt operator.

Thus it is another object of the invention to provide an interlock that may be overcome when the cabinet door is open in a secondary operation by moving the lever against its biasing spring manually.

The handle attachable to the sidewall of the cabinet to engage the rotary shaft may have a means for receiving a padlock to prevent rotation of the handle.

Thus it is another object of the invention to provide for an absolute lockout of the fuse block that may not be defeated even when the cabinet door is open. Because the handle is always connected to the rotary shaft, locking of the handle is sufficient in this regard.

It is another object of the invention to provide such a lockout that does not prevent access to the interior of the cabinet. Unlike a locking of a front handle, a locking of a side-mounted handle does not prevent opening of the door.

The bolt operator may be a cam disk and the stop and bolt-retracting surfaces may be portions of the periphery of the cam disk. Thus it is another object of the invention to provide an extremely simple mechanism for realizing the interlocks that are required.

The fuse block may include a fuse block shaft extending outward along a side face of the fuse block to be substantially perpendicular to the rear panel when the support face is mounted against the rear panel, and the fuse block shaft may support a gear having radially outward teeth, and the bolt operator plate may include a series of corresponding slots whose separations form teeth engaging teeth on the gear of the fuse block shaft whereby torque on the rotary actuator may be converted to corresponding torque on the fuse block shaft.

Thus it is another object of the invention to provide a kit for converting a standard fuse block having a forwardly extending rotary shaft for use with a side mount handle configuration using a thereby simplifying stocking and manufacturing of fuse blocks.

The above objects and advantages may apply to only some embodiments falling within the claims and thus do not define the scope of the invention.

DETAILED DESCRIPTION OF THE PREFERRED EMBODIMENT

Figure 1:
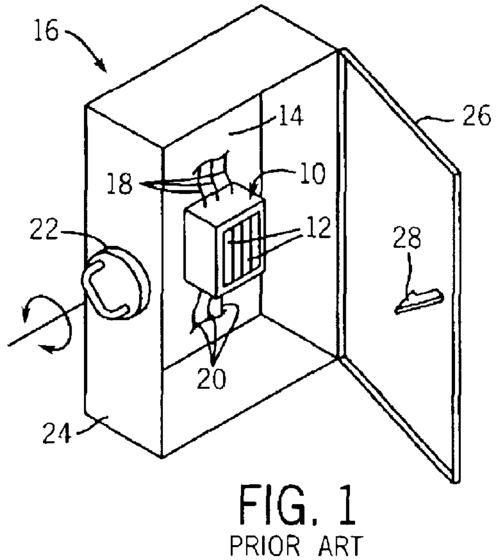
FIG. 1 PRIOR ART
FIG. 1 is a perspective view of a fuse block assembly of the present invention mounted to the side wall of a cabinet and having a side-extending disconnect shaft received by a sidewall-mounted handle and showing an interlock finger extending inward from a rear surface of a front door of the cabinet.

Referring now to FIG. 1, a fuse block assembly 10 may receive fuse cartridges 12 at its front face and may attach at its side face to a side wall of a cabinet 16 to abut the rear wall 14 of the cabinet 16. The open face of the cabinet 16 may be covered by a door 26 supporting an inwardly extending finger 28.

Input terminals along the top of the fuse block assembly 10 may receive power conductors 18 which connect independently through a set of disconnect contacts (not shown) to one side of each fuse cartridge 12. The disconnect contacts may be controlled by a rotary handle 22 mounted to a sidewall 24 of the cabinet 16. The use of a side mounted rotary handle 22 reduces some tolerance problems required when alignment with a handle on the door is required. Permanent locking of the fuse block assembly 10 may be obtained by using the lock mechanism previously built into the rotary handle 22 according to methods well known in the art.

As is understood in the art, when the disconnect contacts are closed, the fuse cartridges 12 joins power conductors 18 to power conductors 20 which attach at output terminals along the bottom of the fuse cartridge 12. The power conductors 18 and 20, for example, may be for three-phase power and may provide power to a motor or other piece of equipment (not shown).

Figure 2:
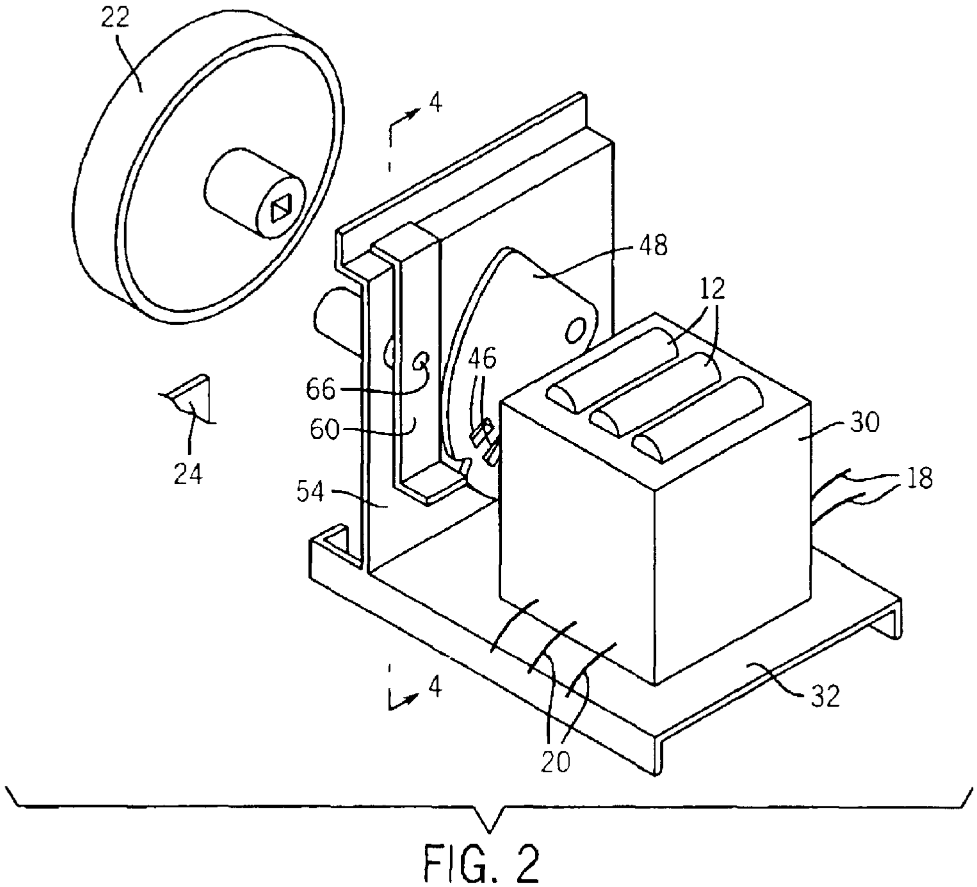
FIG. 2 is a simplified perspective view of the fuse block assembly of FIG. 1 showing a cam plate mounted to one end of the side mounted shaft engaged by the handle and a pivoting bolt such as interacts with the cam plate.
Figure 4:
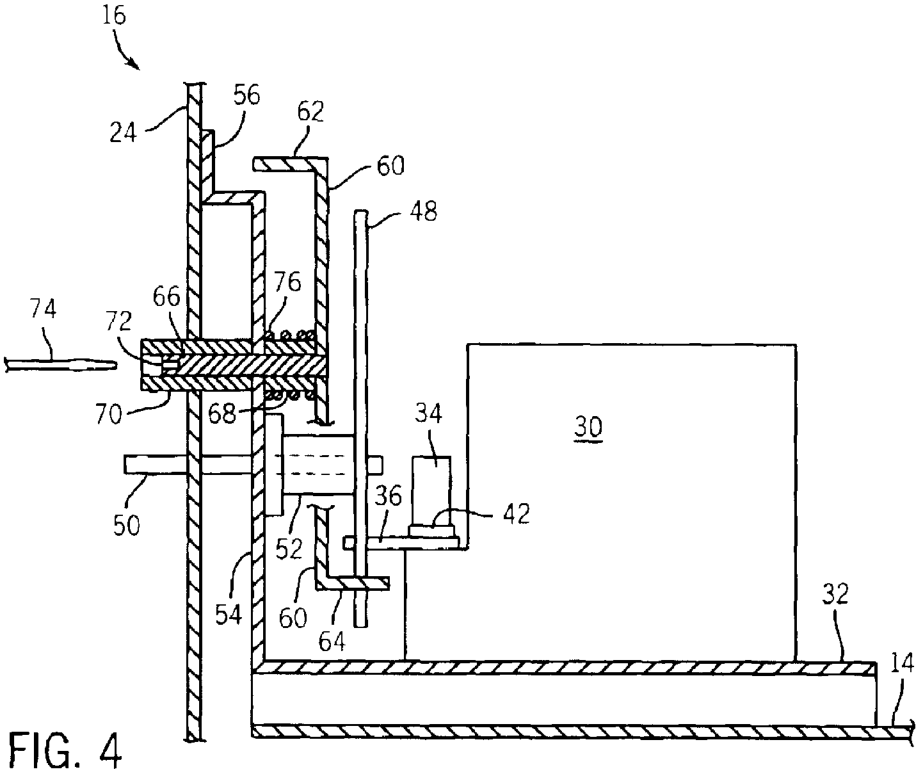
FIG. 4 is a cross-sectional view along lines 4—4 of FIG. 2 showing the relative orientation of the gear of FIG. 3, which fits on a frontward extending shaft of the fuse block, and the cam plate of FIG. 2, and further showing a pivot mounting of the bolt of FIG. 2 where the axle of the bolt is accessible from outside of the cabinet.

Referring now to FIGS. 2 and 4, a fuse block 30, being part of the fuse block assembly 10 and holding the fuse cartridges 12 and the disconnect contacts, may be mounted at its rear surface on a support plate 32. An upwardly extending square shaft 34 (shown in FIG. 4) rotates to open and close the disconnect contacts and connect and disconnect the fuse cartridges 12 to and from the power conductors 18.

Figure 3:
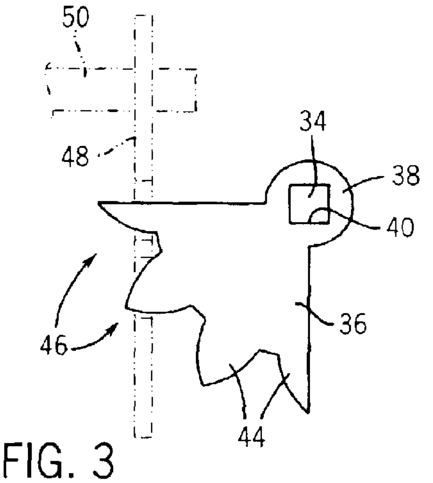
FIG. 3 is a top plan view of a gear that engages with gear slot/teeth on the cam plate of FIG. 2.

Referring now to FIGS. 2, 3 and 4, a quarter gear 36 having a hub 38 with a square aperture 40 may be fit over the vertically extending shaft 34 of the fuse block 30 and secured by a split ring 42 or the like. Teeth 44 of the quarter gear 36 extending horizontally parallel to the rear wall 14 engage corresponding teeth 46 formed as cutouts in a vertically oriented cam plate 48 turning about a shaft 50. The axis of the shaft 50 is generally parallel to the rear wall 14 of the cabinet 16, and perpendicular to the axis of the upwardly extending shaft 34. The interengaging teeth 44 and 46 provide that rotation of the shaft 50 produces a corresponding rotation of shaft 34 and vice versa.

The use of quarter gear 36 allows the present invention to make use of a standard fuse block having a vertically extending fuse shaft 34 simplifying and reducing the number of different fuse blocks required for different applications.

The fuse block 30 may be simply mounted on plate 32 holding the remaining components described herein to convert a standard fuse block 30 to a side mounting operation.

Referring to FIG. 4, shaft 50 may be supported on a bearing 52 attached to a vertical wall 54 formed by an upwardly bent section of support plate 32. Vertical wall 54 may include feet 56 that abut the sidewall 24 of the cabinet 16 spacing the vertical wall 54 therefrom and serving to attach the support plate 32 to the cabinet 16 and in abutment with the rear wall 14 of the cabinet 16.

As positioned, shaft 50 may extend through the sidewall 24 of the cabinet 16 to be received by rotary handle 22 held captive on sidewall 24. It will be understood that in this way, a fuse block 30 having an upwardly extending shaft 34, may be operated through a side mounted rotary handle 22 without changing the orientation of the fuse block 30 such as might decrease access to the fuse cartridges 12. Generally therefore, rotation of the rotary handle 22 acting on shaft 50 causes a corresponding rotation of the shaft 34 allowing disconnecting and connecting of the fuses from outside of the cabinet.

Referring again to FIG. 2, vertical wall 54 of the fuse block assembly 10 also supports a lever bolt 60 having opposed upper end 62 and lower end 64, these ends formed as outward and inward bends in the lever bolt 60, respectively. Lever bolt 60 is center mounted on an axle 66 supported by bearing spacer 68 attached to the vertical wall 54 holding the axle 66 adjacent to and parallel with shaft 50. Axle 66 turns with the lever bolt 60 and extends through sidewall 24 to be accessible near the rotary handle 22. A tubular shroud 70 surrounds the axle 66 as it extends from the sidewall 24 out of the cabinet 16. The outer end of the axle 66 includes a screw slot 72 that may be engaged by a screwdriver blade 74. In this way, axle 66 may be rotated by intentional manipulation with a screwdriver, but is unlikely to be accidentally rotated. As will be described further below, rotation of the axle 66 allows overriding of the locking of the door 26 of the cabinet 16 when power is connected to the fuse block assembly 10.

Figure 5:
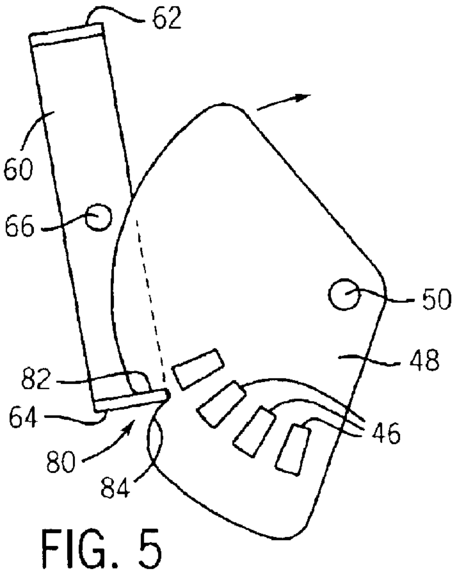
FIG. 5 is an elevational view of the bolt and cam plate of FIGS. 2 through 4 when the lid is open and the fuses of the fuse block are disconnected showing how the cam plate prevents a clockwise rotation of the bolt.

Referring to FIGS. 2, 4 and 5, a spring 76 is wrapped about the bearing spacer 68 and connects between the vertical wall 54 and the lever bolt 60 to bias the lever bolt 60 in a counterclockwise direction (as viewed from inside the cabinet 16 looking toward the sidewall 24) so that the lower end 64 of the lever bolt 60 acts like a cam follower riding against the outer periphery of the cam plate 48.

Referring specifically now to FIG. 5, in an initial state, the cabinet door 26 may be opened and the lower end 64 of the lever bolt 60 may be engaged with a stop surface 80 formed in the periphery of the cam plate 48. The stop surface 80 has a radial face, 82 extending along a line of radius from the axle 66 and preventing counterclockwise rotation of the cam plate 48 when the lower end 64 is so engaged without creating an incidental outward force on the lower end 64. A rear sloped face 84 of the stop surface, however, has a slope and thus allows clockwise rotation of the cam plate 48 such as pushes radially outward on the lower end 64 disengaging it.

Figure 10:
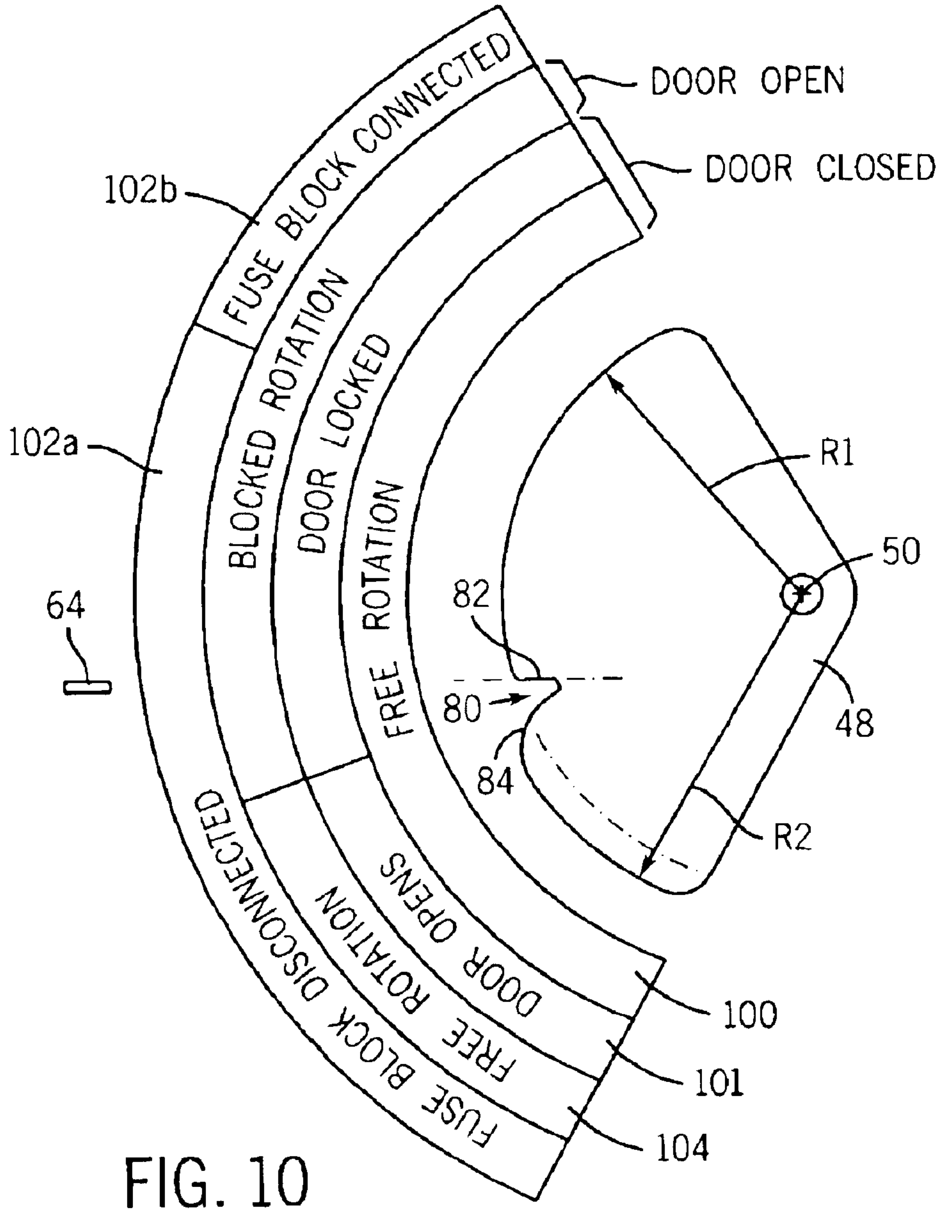
FIG. 10 is a view of the cam plate of FIGS. 5 through 9 mapping the function of the cam plate onto its profile.

Referring momentarily to FIG. 10, the periphery of the cam plate 48 clockwise from the stop surface 80 has a constant radius R1 whereas the periphery of the cam plate 48 counterclockwise from the stop surface after the sloped face 84 has a constant radius R2 greater than R1. The position of the cam plate 48 when the lower end 64 of the lever bolt 60 is engaged with the stop surface 80, per FIG. 5, corresponds to a position of the shafts 50 and 34 in which the fuse cartridges 12 of the fuse block 30 are disconnected from the power connections as indicated by band **102*a*. It will be understood therefore in FIG. 5, that with the lower end 64 engaging the stop surface 80*a*, reconnection of the fuse cartridges 12, per band 102*b*, such as would require a counterclockwise rotation of shaft 50, is prevented. However, a clockwise rotation of the cam plate 48, such as does not reconnect the fuse cartridges 12, is possible, with the lower end 64 riding up on the sloped face 84 to radius R2. Manual override of the system when the cabinet door 26 is open may be obtained easily by placing a finger on the upper end 62 of the lever bolt 60** and manually rotating it in a clockwise direction against its spring bias.

Figure 6:
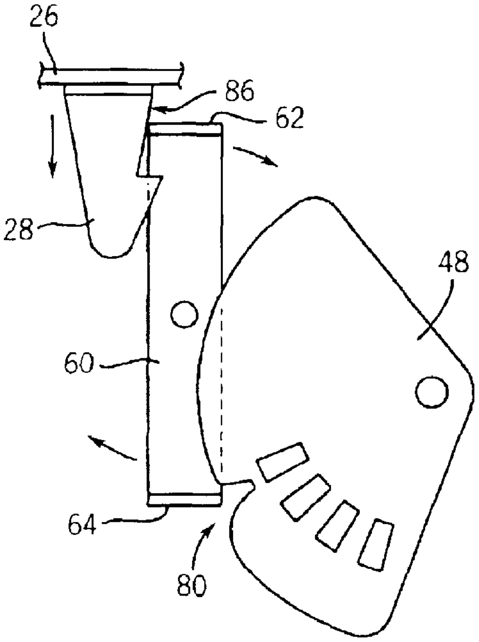
FIG. 6 is a figure similar to that of FIG. 5 when the cabinet door is shut such as moves a finger down to cause clockwise rotation of the bolt releasing the cam plate.
Figure 7:
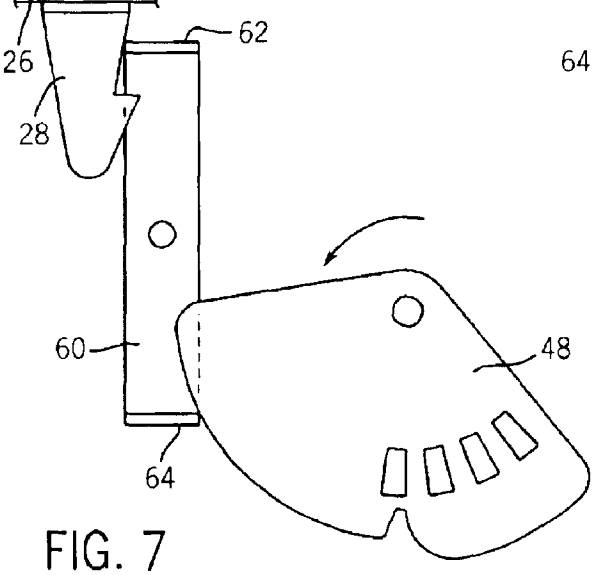
FIG. 7 is a figure similar to that of FIGS. 5 and 6 showing rotation of the cam plate after closure of the door of FIG. 6 to reconnect the fuse block power connection.

Referring now to FIG. 6, with closure of the door 26, finger 28 descends proximate to the upper end 62 of the lever bolt 60. Finger 28 has a wedge surface 86 that operates to push against the upper end 62 to cause clockwise rotation of the lever bolt 60 disengaging the lower end 64 from the stop surface 80 of the cam plate 48. Accordingly, after door 26 is closed, cam plate 48 is free to rotate in a counterclockwise direction to cause engagement of the power conductors 18 to the fuse cartridges 12 per band **102*b* of FIG. 10**.

With such closure of the door 26, the lower end 64 of the lever bolt 60 rides along the periphery of the cam plate 48 at the first radius R1. In this position, the cam plate 48 holds the lever bolt 60 away from the wedge surface 86 of the finger 28, but still above a hook portion 90 of the finger 28 which dropped below upper end 62 when the door 26 was closed, effecting by a momentary clockwise rotation of the lever bolt 60 by second wedge surface 92 on leading edge of hook portion 90.

Figure 8:
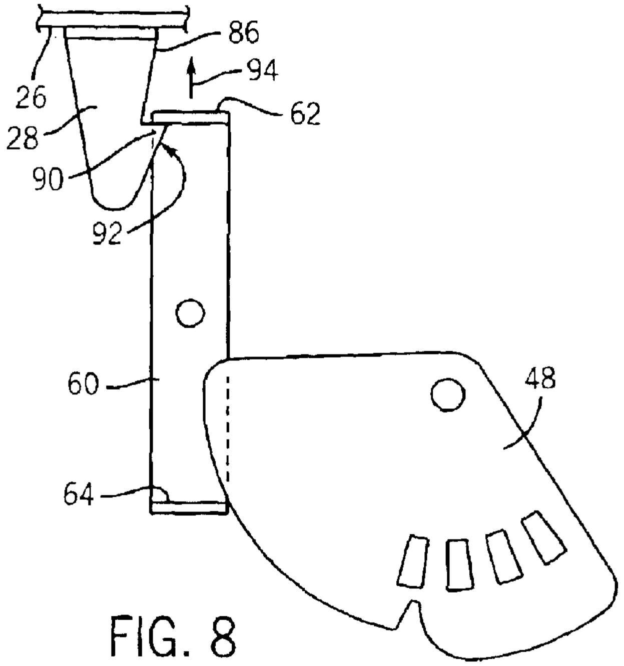
FIG. 8 is a figure similar to FIGS. 5 through 7 showing an interengaging of the bolt and finger when power is connected to the fuse block and an attempt is made to open the door.

Referring now to FIG. 8, with the lever bolt 60 held on the periphery of the cam plate 48 at R1, upward motion of the hook finger 28 as indicated by arrow 94 is blocked by the upper end 62 of the lever bolt 60. Thus, without further effort, the door 26 may not be opened when the cam plate 48 is in a position connecting the fuse cartridges 12 to the power conductors 18.

It will be understood from this description that a simple changing of the length of the finger 28 will allow the present invention to work with a variety of different cabinet sizes and mounting locations and further, that the exact dimensions of the finger 28 are not critical as the hook portion 90 may pass or over travel the upper end 62 of the lever bolt 60 by a considerable distance without undesirable effects.

Referring now to FIG. 4, the door 26 may nevertheless be opened in certain cases where it is necessary to have access to the interior of the cabinet 16 when the fuse cartridges 12 are connected to the power conductors 18 by defeating the action of the lever bolt 60. This may be done by insertion of a screwdriver blade 74 into the shroud 70 to provide for a slight clockwise rotation of the lever bolt 60 with lower end 64 moved away from cam plate 48 against its biasing spring.

Figure 9:
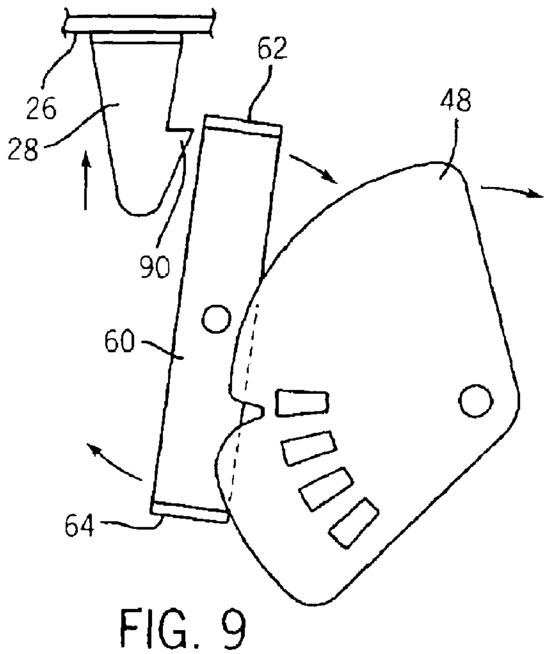
FIG. 9 is a view similar to FIGS. 5 through 8 showing clockwise rotation of the cam plate to disconnect the fuse block and to cause clockwise rotation of the bolt releasing the finger to allow the door of the cabinet to be opened.

Alternatively, as shown in FIG. 9, cam plate 48 may be returned to its clockwise position disconnecting the power conductors 18 from the fuse cartridges 12 per band **102*a* of FIG. 10 and by further clockwise rotation, the lower end 64 of the lever bolt 60 may pass the stop surface 80 to ride up on the region of the periphery of the cam plate 48 at radius R2 causing a clockwise rotation of the lever bolt 60 similar to that provided by the screwdriver and removing upper end 62 from interference with the hook portion 90 of the finger 28** so that the door may be opened.

In summary and referring to FIG. 10, when the door 26 is closed as indicated by bands 100 and 101, there is free rotation of the cam plate 48 and thus, the fuse block may be connected or disconnected per band 102 without interference. Except for the use of a screwdriver blade as described above per band 101, the door 26 may not be opened when the lower end 64 of the lever bolt 60 is aligned with any portion of the periphery of the cam plate 48 counterclockwise to the stop surface 80.

When the door is opened as indicated by band 104, rotation of the cam plate beyond stop surface 80 is blocked but there is free rotation of the cam plate 48 clockwise to the region counterclockwise to the stop surface 80.

It is specifically intended that the present invention not be limited to the embodiments and illustrations contained herein, but include modified forms of those embodiments including portions of the embodiments and combinations of elements of different embodiments as come within the scope of the following claims.

We claim:

1. A disconnect mechanism for a fuse block receiving power connections, the fuse block having a support face for fitting inside of a cabinet and holding one or more fuses accessible on a front face of the fuse block opposite the support face, the disconnect mechanism comprising:

a rotary shaft communicating with the fuse block and extending outward parallel to the rear panel when the support face of the fuse block is mounted parallel to the rear panel, an outer end of the rotary shaft adapted to receive a portion of a handle mounted on a side of the cabinet, the rotary shaft rotating to disconnect the fuses from the power connections;

a bolt operator extending radially from the rotary shaft to rotate therewith and providing a stop surface;

a bolt movable between a lock position where the bolt may engage the stop surface preventing free rotation of the rotary shaft to connect the fuses to the power connections, and an unlock position where the bolt is disengaged from the stop surface allowing free rotation of the rotary shaft to connect the fuses to the power connections; and a finger mountable on a door of the cabinet to engage the bolt when the door is closed to move the bolt to the unlocked position;

whereby inadvertent rotation of the rotary shaft may be prevented when the cabinet door is open.

2. The disconnect mechanism of claim 1 wherein the bolt operator further includes a bolt-retracting surface engaging the bolt to move the bolt to a door release position;

and wherein the bolt includes a surface engaging the finger to prevent opening of the cabinet door when the bolt is not in the door release position.

3. The disconnect mechanism of claim 2 wherein the bolt-retracting surface engages the bolt only when the rotary shaft is positioned to disconnect the fuses from the power connections.

4. The disconnect mechanism of claim 1 wherein the finger includes a cam surface moving the bolt to the unlock position when the door is fully closed.

5. The disconnect mechanism of claim 1 wherein the bolt is a lever centrally mounted to an axle extending on parallel to the rotary shaft, the lever pivoting about an axis of the axle to move between the lock and unlock positions.

6. The disconnect mechanism of claim 5 wherein the axle is sized to extend through a side wall of the cabinet when the support face is mounted in the cabinet;

whereby the bolt position may be manually overridden to allow opening of the cabinet when the rotary shaft is positioned to connect the fuses to the power connections.

7. The disconnect mechanism of claim 5 wherein an end of the axle extending outside of the cabinet is shrouded by a tube and wherein the end has a head to allow actuation with a standard tool fitting within the shrouding tube.

8. The disconnect mechanism of claim 5 including a spring rotationally biasing the lever toward engagement with the bolt operator.

9. The disconnect mechanism of claim 1 including a handle attachable to the side wall of the cabinet to engage the rotary shaft and further having a means for receiving a padlock to prevent rotation of the handle.

10. The disconnect mechanism of claim 2 wherein the bolt operator is a cam disk having a periphery and wherein the stop and bolt-retracting surfaces are portions of the periphery of the cam disk.

11. The disconnect mechanism of claim 1 wherein the fuse block includes a fuse block shaft extending outward along a side face of the fuse block to be substantially perpendicular to the support face and wherein the fuse block shaft supports a gear having radially outward teeth and wherein the bolt operator further includes a series of corresponding teeth engaging the teeth on the gear of the fuse block shaft; whereby torque on the rotary shaft may be converted to corresponding torque on the fuse block shaft;

whereby a side extending rotary shaft may be provided for a fuse block having a forward extending fuse block shaft.

12. A kit for a fuse block receiving power connections and of a type having a support face for mounting against a rear panel of a cabinet with one or more fuse sockets accessible on a front face of the fuse block opposite the support face and with a fuse block shaft extending outward along a side face of the fuse block to be substantially perpendicular to the support face and rotating to disconnect the fuses from the power connections, the kit comprising:

a rotary shaft;

a support plate having a first portion receiving the support face of the fuse block and a second portion holding the rotary shaft extending parallel to the support face;

a bolt operator extending radially from the rotary shaft to rotate therewith and providing a stop surface;

a gear fitting on the fuse block shaft to engage the bolt operator to turn therewith;

a bolt movable between a lock position where the bolt may engage the stop surface preventing free rotation of the rotary shaft to connect the fuses to the power connections, and an unlock position where the bolt is disengaged from the stop surface allowing free rotation of the rotary shaft to connect the fuse sockets, the bolt further having an actuator surface; and a finger mountable on a door of the cabinet to engage the bolt when the door is closed to move the bolt to the unlocked position;

whereby a fuse block with a front facing shaft may be converted to use with a side-facing shaft.

13. The disconnect mechanism of claim 12 wherein the bolt operator further includes a bolt-retracting surface engaging the bolt to move the bolt to a door release position;

and wherein the bolt includes a surface engaging the finger to prevent opening of the cabinet door when the bolt is not in the door release position.

14. The disconnect mechanism of claim 13 wherein the bolt-retracting surface engages the bolt only when the rotary shaft is positioned to disconnect the fuses from the power connections.

15. The disconnect mechanism of claim 12 wherein the finger includes a cam surface moving the bolt to the unlock position when the door is fully closed.

16. The disconnect mechanism of claim 12 wherein the bolt is a lever centrally mounted to an axle extending on parallel to the rotary shaft, the lever having a first end providing the actuation surface and a second end engagable with the bolt operator, the lever pivoting about an axis of the axle to move between the lock and unlock positions.

17. The disconnect mechanism of claim 16 wherein the axle is sized to extend through a side wall of the cabinet when the support plate is mounted in a cabinet;

whereby the bolt position may be manually overridden to allow opening of the cabinet when the rotary shaft is positioned to connect the fuses to the power connections.

18. The disconnect mechanism of claim 16 wherein an end of the axle extending outside of the cabinet is shrouded by a tube and wherein the end has a head to allow actuation with standard tool fitting within the shrouding tube.

19. The disconnect mechanism of claim 16 including a spring rotationally biasing the lever toward engagement with the bolt operator.

20. The disconnect mechanism of claim 12 including a handle attachable to the side wall of the cabinet to engage the rotary shaft and further having a means for receiving a padlock to prevent rotation of the handle.

21. The disconnect mechanism of claim 13 wherein the bolt operator is a cam disk having a periphery and wherein the stop and bolt-retracting surfaces are portions of the periphery of the cam.

* * * * *